(12) United States Patent
Oosawa

(10) Patent No.: US 7,724,936 B2
(45) Date of Patent: May 25, 2010

(54) IMAGE GENERATION APPARATUS AND IMAGE GENERATION METHOD FOR DETECTING ABNORMALITIES

(75) Inventor: Akira Oosawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 810 days.

(21) Appl. No.: 11/157,812

(22) Filed: Jun. 22, 2005

(65) Prior Publication Data

US 2006/0004282 A1    Jan. 5, 2006

(30) Foreign Application Priority Data

Jun. 22, 2004   (JP)   ............................... 2004-183333

(51) Int. Cl.
*G06K 9/00* (2006.01)
(52) U.S. Cl. .................. 382/132; 382/190; 382/224
(58) Field of Classification Search ................ 382/132, 382/190, 224
See application file for complete search history.

(56) References Cited

U.S. PATENT DOCUMENTS

| | | | |
|---|---|---|---|
| 5,359,513 A | 10/1994 | Kano et al. | |
| 5,790,690 A * | 8/1998 | Doi et al. | 382/128 |
| 7,257,245 B2 * | 8/2007 | Oosawa | 382/132 |
| 2001/0048757 A1 | 12/2001 | Oosawa | |
| 2003/0210813 A1 | 11/2003 | Oosawa | |

FOREIGN PATENT DOCUMENTS

JP    2002-158923 A    5/2002

* cited by examiner

*Primary Examiner*—Vikkram Bali
*Assistant Examiner*—Katrina Fujita
(74) *Attorney, Agent, or Firm*—Sughrue Mion, PLLC

(57) ABSTRACT

An artificial image used for comparison with a medical image can be generated efficiently and accurately. A medical image including anatomically characteristic structures obtained by radiography of a predetermined part of a subject such as a human body is classified into segments having similar anatomic characteristics represented by the structures. The artificial image is generated for a specified one of the segments regarding the structures in normality.

9 Claims, 13 Drawing Sheets

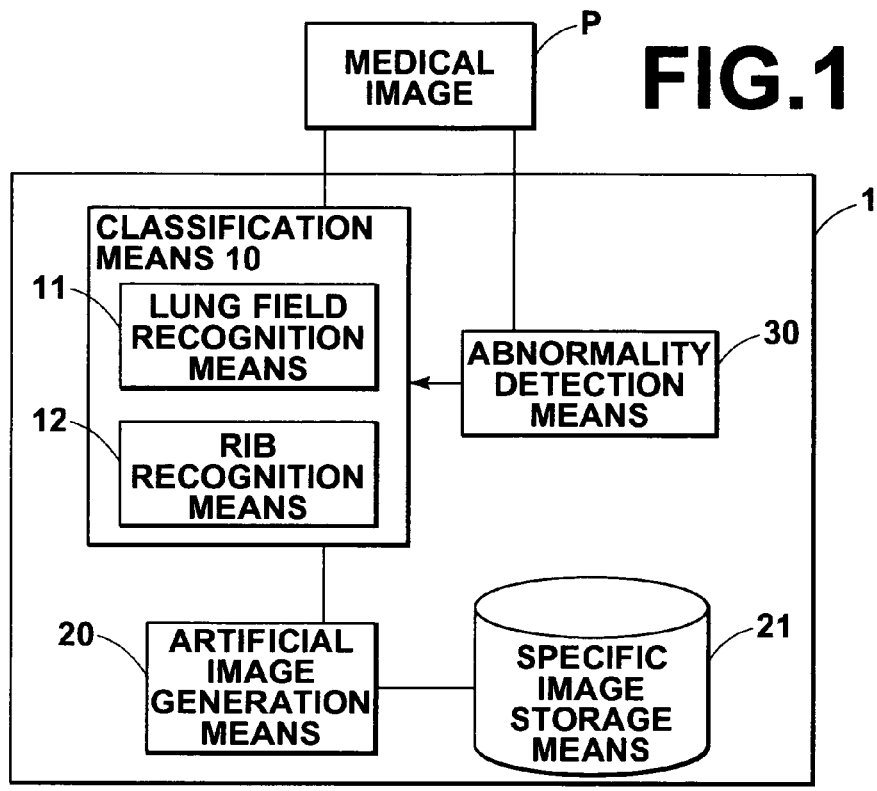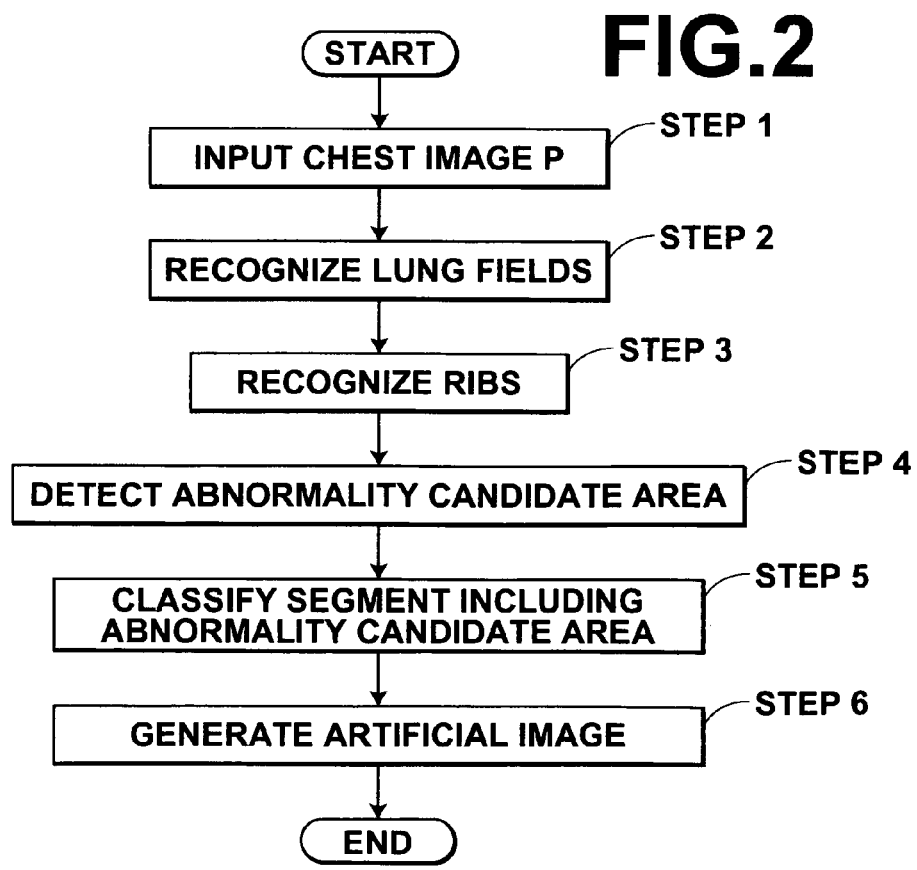

| $f_{11}$ | $f_{12}$ | $f_{13}$ | $f_{14}$ | $f_{15}$ |
|---|---|---|---|---|
| $f_{21}$ | | | | $f_{25}$ |
| $f_{31}$ | | j | | $f_{35}$ |
| $f_{41}$ | | | | $f_{45}$ |
| $f_{51}$ | $f_{52}$ | $f_{53}$ | $f_{54}$ | $f_{55}$ |

GRADIENT VECTOR
$q$
PIXEL $j$
$\theta_j$
$l$
PIXEL $i$ $r$ $d$
$R$
$l$

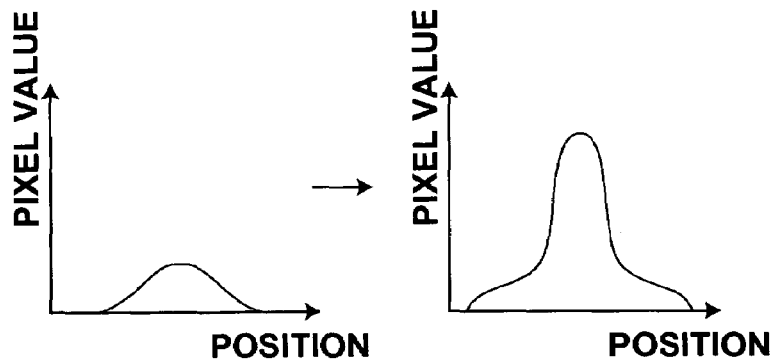
FIG.10A  FIG.10B  FIG.10C
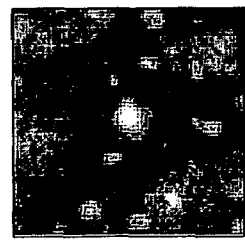
NODULE IMAGE
(ORIGINAL IMAGE)
IMAGE OUTPUT AFTER APPLYING
ADOPTIVE RING FILTER
(ENHANCED IMAGE)
FIG.11A  FIG.11B

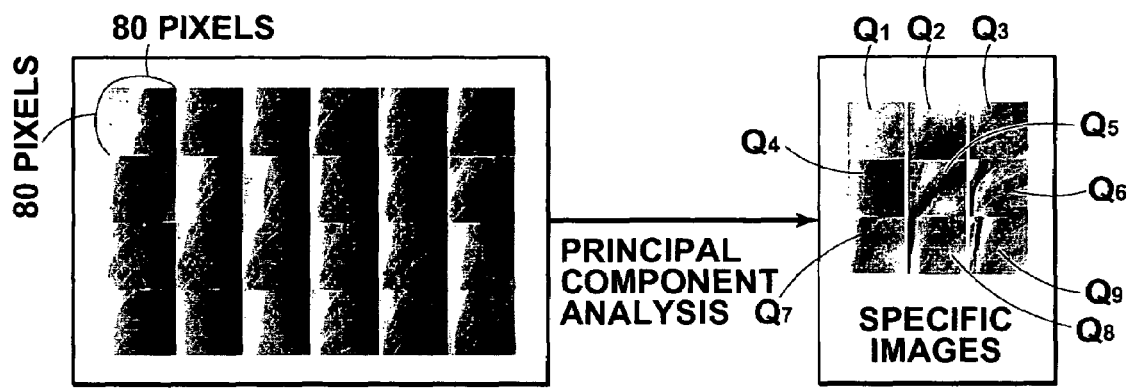
FIG.16A  FIG.16B
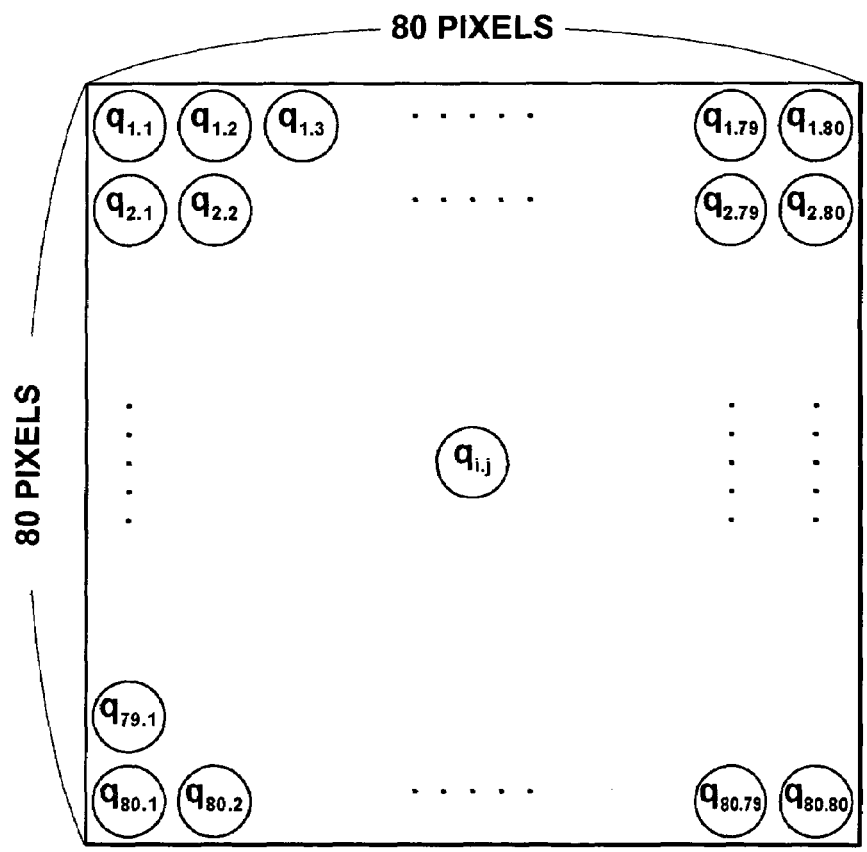
FIG.17

IMAGE GENERATION APPARATUS AND IMAGE GENERATION METHOD FOR DETECTING ABNORMALITIES

BACKGROUND OF THE INVENTION

1. Field of the Invention

The present invention relates to an image generation apparatus and an image generation method for aiding detection of an abnormality candidate by reading a medical image. The present invention also relates to a program that causes a computer to execute the image generation method.

2. Description of the Related Art

In the field of medicine, two or more medical images of the same patient radiographed at different times have been compared for detecting an abnormality based on a difference between the images and for discussing therapeutic measures by understanding the progression or remission of a disease, for example.

A small abnormal pattern such as that indicative of lung cancer at an early stage is especially easy to miss. Therefore, Japanese Unexamined Patent Publication No. 2002-158923, for example, describes a method for detecting a candidate of such an abnormality. In this method, subtraction processing or the like is carried out between corresponding pixels in two medical images radiographed at different times for finding a difference. In a temporal subtraction image representing the difference, an area having pixels of a predetermined value or larger, or an area having a characteristic shape such as a circular shape is detected as the candidate.

However, in two target images radiographed at different times, positions of the subject are different due to a change in posture of the patient at the time of radiography, for example. Therefore, in order to obtain a subtraction image, positional matching is generally carried out between the images to be processed. U.S. Pat. No. 5,359,513 and U.S. Patent Application Publication No. 20010048757 describe methods for such positional matching, for example. As one of such methods, at least one of two images of the same patient is subjected to global position matching (a linear transform such as an affine transform) including rotation, translation, and enlargement or reduction. Local position matching is also carried out according to non-linear transformation processing (warping processing such as a non-linear transform adopting curve fitting using a quadratic polynomial) based on a relationship between corresponding positions obtained by template matching on local areas. In addition, global position matching and local position matching may be carried out in combination. Furthermore, positional matching is further carried out in a local area having a large positional difference and the vicinity thereof.

These methods are used for positional matching between two-dimensionally projected images. Therefore, in the case where a large three-dimensional positional difference (leaning forward or backward or twisting sideways) is observed due to a posture change of the patient in images, positional matching is not carried out accurately. Therefore, an artifact is generated in a subtraction image, which leads to inaccurate detection of an abnormality. Furthermore, in the case where a patient does not have any image radiographed in the past, no image is used for comparison. Therefore, the methods using a subtraction image cannot be used, regardless of effectiveness of the methods for detecting an abnormal pattern such as that indicative of lung cancer, which tends to be missed.

For this reason, an apparatus for detecting a candidate of an abnormality area has been proposed in U.S. Patent Application Publication No. 20030210813, for example. As "teacher data" in this apparatus are used images in a database storing normal structure images of a subject and shapes of anatomic characteristics extracted from the images. Based on the teacher data, statistical models of normal structures of a subject (a shape change model, a texture change model, a correlation model between shape and texture) are generated, and a normal structure image corresponding to an input medical image is artificially generated based on the models. The candidate of an abnormality area is then detected based on the normal structure image and the input medical image.

The method of artificially generating the normal structure image is effective for detecting a small abnormality area that tends to be missed, even in the case where a large three-dimensional positional change is observed in images of a patient due to a posture change of the patient or in the case where no medical image radiographed in the past is available. However, in computer-aided diagnosis (CAD) regarding the chest, a detected candidate of lung cancer is generally divided into regions of interest, and each of the regions is subjected to lung cancer diagnosis. Therefore, generating an artificial image of the entire chest is not efficient.

Furthermore, characteristics appearing in images vary between the cases of presence and absence of structures such as ribs in the images. Therefore, in the case where an artificial image of the entire chest is generated, the image may have a characteristic that is partially different from that of an original image.

Consequently, accurate generation of an artificial image is desired regarding a region of interest where an abnormality has been detected, rather than generation of an artificial image regarding the entire chest.

SUMMARY OF THE INVENTION

The present invention has been conceived based on consideration of the above circumstances. An object of the present invention is therefore to provide an image generation method, an image generation apparatus, and a program for enabling detection of an abnormality with more effectiveness and accuracy than conventional image reading by comparison.

An image generation apparatus of the present invention comprises:

classification means for classifying a plurality of segments obtained by dividing a medical image generated by radiography of a predetermined part of a subject such as a human body and including structures having anatomic characteristics, into segments wherein the anatomic characteristics represented by the structures are similar; and artificial image generation means for generating an artificial image of a segment wherein the structures are normal, for at least one of the segments having been classified.

An image generation method of the present invention comprises the steps of:

classifying a plurality of segments obtained by dividing a medical image generated by radiography of a predetermined part of a subject such as a human body and including structures having anatomic characteristics, into segments wherein the anatomic characteristics represented by the structures are similar; and generating an artificial image of a segment wherein the structures are normal, for at least one of the segments having been classified.

A program of the present invention causes a computer to function as:

classification means for classifying a plurality of segments obtained by dividing a medical image generated by radiography of a predetermined part of a subject such as a human body and including structures having anatomic characteristics, into segments wherein the anatomic characteristics represented by the structures are similar; and artificial image generation means for generating an artificial image of a segment wherein the structures are normal, for at least one of the segments having been classified.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

The subject such as a human body refers to a body of an animal such as a cat and a dog, in addition to a human body.

The predetermined part of the subject refers to a part of a body of a human or an animal classified according to the position thereof, such as chest, head, and upper arm.

The structures refer to organs comprising the predetermined part of the subject.

The anatomic characteristics represented by the structures are similar in the case where characteristics resulting from constitutions and locations of organs are similar. For example, a chest includes organs such as ribs, soft tissue, and a heart. A part of a chest radiograph wherein only one rib is shown has different anatomic structures from a part wherein two ribs are shown, due to a difference in density of pixel values. However, if two parts therein respectively include one rib, the density of pixel values becomes similar. Therefore, the two parts have similar anatomic characteristics. Furthermore, a positional difference such as a peripheral part or a mediastinal part in lung fields also causes differences in density and texture, generating images that are not similar. However, similar images are obtained within the same peripheral part, depending on the number (either 1 or 2) of ribs shown therein.

The phrase that the structures are normal refers to a state wherein each of organs comprising each part is normal.

The image generation apparatus of the present invention may further comprise abnormality detection means for detecting a candidate area of an abnormality from the medical image so that the artificial image generation means can generate the artificial image corresponding to the segment including a position at which the candidate area has been detected.

The artificial image generation means may comprise Eigen-image storage means for storing Eigen-images respectively having characteristics appearing specifically to the classified segments when the structures in the segments are normal. In this case, the artificial image generation means generates the artificial image of the segment by adding the corresponding Eigen-images after weighting the corresponding Eigen-images according to a degree of similarity with the segment regarding which the artificial image is to be generated.

The Eigen-images may be generated as images having the characteristics for each of the segments when the structures are normal therein, by applying a statistic method to images of the normal structures as sample images.

The Eigen-images stored in the Eigen-image storage means may be obtained by principal component analysis of an image of each of the segments wherein the structures are normal in a medical image obtained by radiography of a subject.

In the case where the medical image is a chest image obtained by radiography of the chest of the subject, the classification means preferably comprises:

lung field recognition means for recognizing lung fields in the chest image; and rib recognition means for recognizing ribs in the chest image. In this case, the classification means classifies the plurality of segments based on a position in the lung fields and an overlap of the ribs.

According to the present invention, the divided segments are classified according to the similar anatomic characteristics represented by the structures in the medical image generated by radiography of the predetermined part of the subject such as a human body, and the artificial image can be generated for each of the classified segments. Therefore, the artificial image is generated according to the characteristics of each of the segments. In addition, the artificial image can be generated regarding only the segment having been specified, instead of the entire chest, which is efficient.

If the abnormality candidate area is detected and if the artificial image is generated for the segment including the position of the abnormality candidate area, the image of only the part corresponding to the abnormality is generated for image reading by comparison. In this manner, efficiency and detection accuracy can be improved.

If the artificial image is generated by storing in advance the Eigen-images having the specific characteristics of the normal structures in the classified segments and by adding the corresponding Eigen-images according to the weight corresponding to the degree of similarity between the segment and the corresponding Eigen-images, the image can be generated artificially regarding the normal structures corresponding to a specific one of the segments.

In the case where the Eigen-images have been obtained by principal component analysis of the images of the segments that are normal, the artificial image can be generated for various kinds of images, by combining the Eigen-images in a small quantity.

In the case where the medical image is a chest image obtained by radiography of a chest, if the segments can be classified according to the overlap of the ribs and the positions in the lung fields based on recognition of lung fields and ribs, detection accuracy can be improved when an abnormality such as that of lung cancer is diagnosed.

BRIEF DESCRIPTION OF THE DRAWINGS

FIG. 1 is a block diagram showing the configuration of an image generation apparatus of the present invention;

FIG. 2 is a flow chart showing a procedure carried out in the image generation apparatus;

FIGS. 10A to 10C explain application of the adaptive ring filter;

FIGS. 11A and 11B explain an example of a result of the application of the adaptive ring filter;

FIGS. 16A and 16B show an example of principal component analysis;

FIG. 17 shows pixel components in a sample image; and

DESCRIPTION OF THE PREFERRED EMBODIMENT

Figure 3:
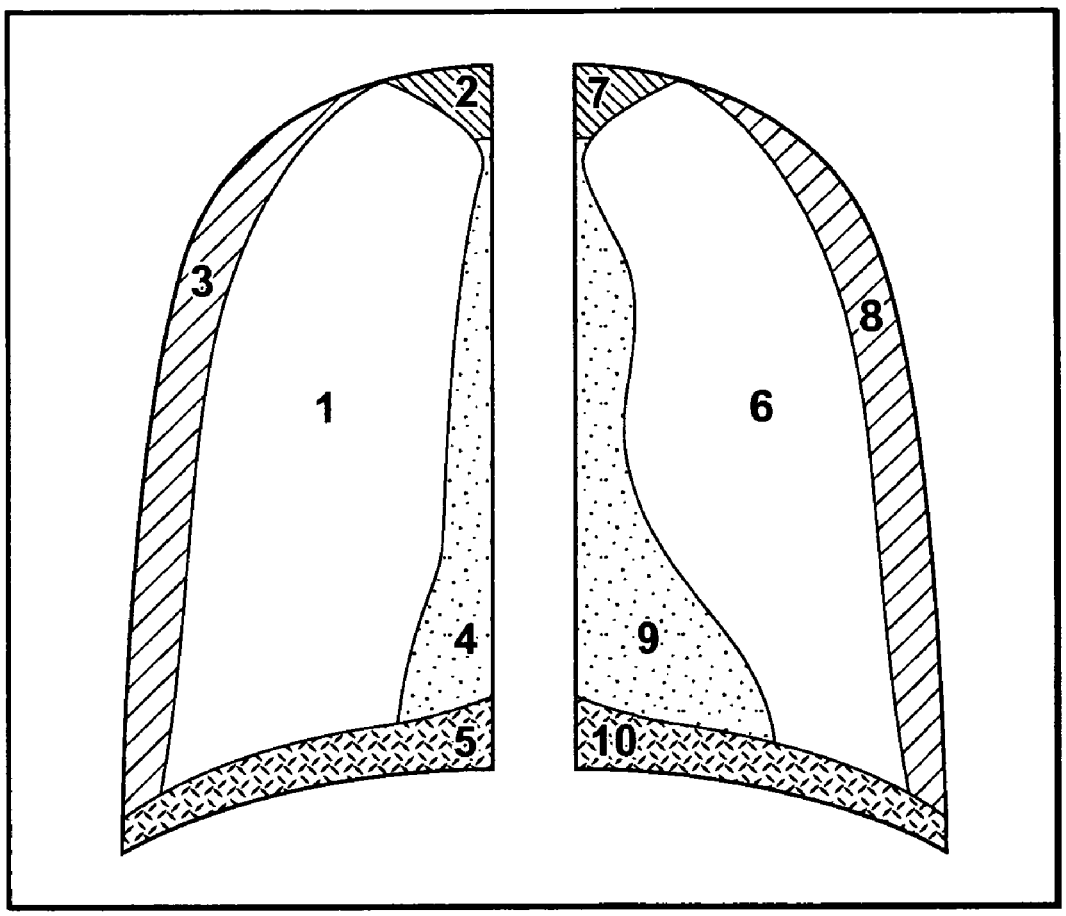
FIG. 3 shows an example of division of lung fields.

Hereinafter, an embodiment of an image generation apparatus of the present invention will be described with reference to the accompanying drawings. As shown in FIG. 1, an image generation apparatus 1 in this embodiment comprises classification means 10 for classifying segments obtained by division of a medical image P according to similar anatomic characteristics, abnormality detection means 30 for detecting a candidate area of an abnormality from the image, and an artificial image generation means 20 for generating an artificial image representing normal structures of a segment corresponding to one of the segments including the abnormality candidate area that has been detected.

The artificial image generation means 20 has Eigen-image storage means 21 for storing Eigen-images each representing specific characteristics of normal structures in each of the segments having been classified according to the anatomic characteristics. The artificial image generation means 20 generates the artificial image of a specified one of the segments obtained by division of the medical image P, by weighted addition of the Eigen-images corresponding to the specified segment.

For example, in the case where the medical image P is a chest image obtained by radiography of a chest, different anatomic characteristics appear according to a position in lung fields and overlap of ribs (one rib or two ribs in the image). An abnormality such as that indicative of lung cancer changes appearance thereof, depending on whether the abnormality is located on ribs or on a part other than ribs. Therefore, in this embodiment, the case will be described below where the artificial image is generated regarding one of the segments of the chest image in which a cancer-like abnormality is observed.

The classification means 10 comprises lung field recognition means 11 for recognizing lung fields and rib recognition means for recognizing ribs. Based on the anatomic characteristics such as a position of a cardiothoracic part and the overlap of ribs, the classification means 10 classifies the segments obtained by division into the segments of similar anatomic characteristics.

The abnormality detection means 30 detects the abnormality candidate area such as that of lung cancer, and the artificial image generation means 20 generates the artificial image of the normal structures at the position where the abnormality candidate area has been detected by the abnormality detection means 30.

A procedure carried out by the image generation apparatus 1 in this embodiment will be described below with reference to a flow chart shown in FIG. 2.

The chest image P of the subject is input to the image generation apparatus 1 (Step 1), and the classification means 10 detects the cardiothoracic part in the chest image P by using the lung field recognition means 11 for detecting the lung fields (Step 2). The rib recognition means 12 recognizes the ribs in the lung fields (Step 3). The abnormality detection means 30 carries out processing for enhancing an abnormality such as a cancerized nodule or tumor, and detects the abnormality candidate area such as that of lung cancer (Step 4). The classification means 10 classifies the segment including the candidate area according to the position of the candidate area in the lung fields and how the ribs overlap at the position (Step 5). In order to generate the artificial image corresponding to any one of the classified segments, the artificial image generation means 20 calculates a degree of similarity between the candidate area and the corresponding Eigen-images stored in the Eigen-image storage means, and generates the artificial image by adding the Eigen-images according to the degree of similarity (Step 6).

Hereinafter, each of the steps will be described in detail.

(1) Lung Field Recognition (Step 2)

The lung fields in the chest image are recognized by detecting the cardiothoracic part therein. An approximate outline of the cardiothoracic part is extracted by applying an edge detection mask such as a Gabor function to the chest image, and a position as an approximate center of the extracted part is found. Conversion into a polar coordinate system is then carried out with reference to the center position as the origin. In the polar coordinate plane, template matching is carried out by using a template of a shape that is approximately similar to an average cardiothoracic outline used as reference, in order to detect the outline of the cardiothoracic part automatically. Areas surrounded by the detected outline of the cardiothoracic part are recognized as the left and right lung fields (shown by 1 and 6 in FIG. 3), and apex areas (shown by 2 and 7), peripheral areas (shown by 3 and 8), mediastinal areas (shown by 4 and 9), and lower diaphragm areas (5 and 10) are then detected with reference to the lung fields (see Japanese Unexamined Patent Publication No. 2003-6661 applied by the assignee, for example).

Alternatively, the lung fields may be divided into the apex areas (shown by 2 and 7), the peripheral areas (shown by 3 and 8), the mediastinal areas (shown by 4 and 9), and the lower diaphragm areas (5 and 10) according to a method proposed in U.S. Pat. No. 6,549,646, for extracting the peripheral areas.

(2) Rib Recognition (Step 3)

For rib recognition, statistical models of the normal structures (without abnormalities) are generated in advance from sample images of radiographed chests as "teacher data". Shapes of the ribs corresponding to the chest image P are then artificially generated based on the models.

Firstly, N chest images are selected as the sample images with clearly shown ribs from a plurality of chest images. Each of the sample images is displayed, and points on anterior and posterior ribs therein are specified as landmarks by using a pointing device such as a mouse. The number of the landmarks is referred to as n, and n is 400, for example. The points are then used as the teacher data for generating the models.

Figure 4:
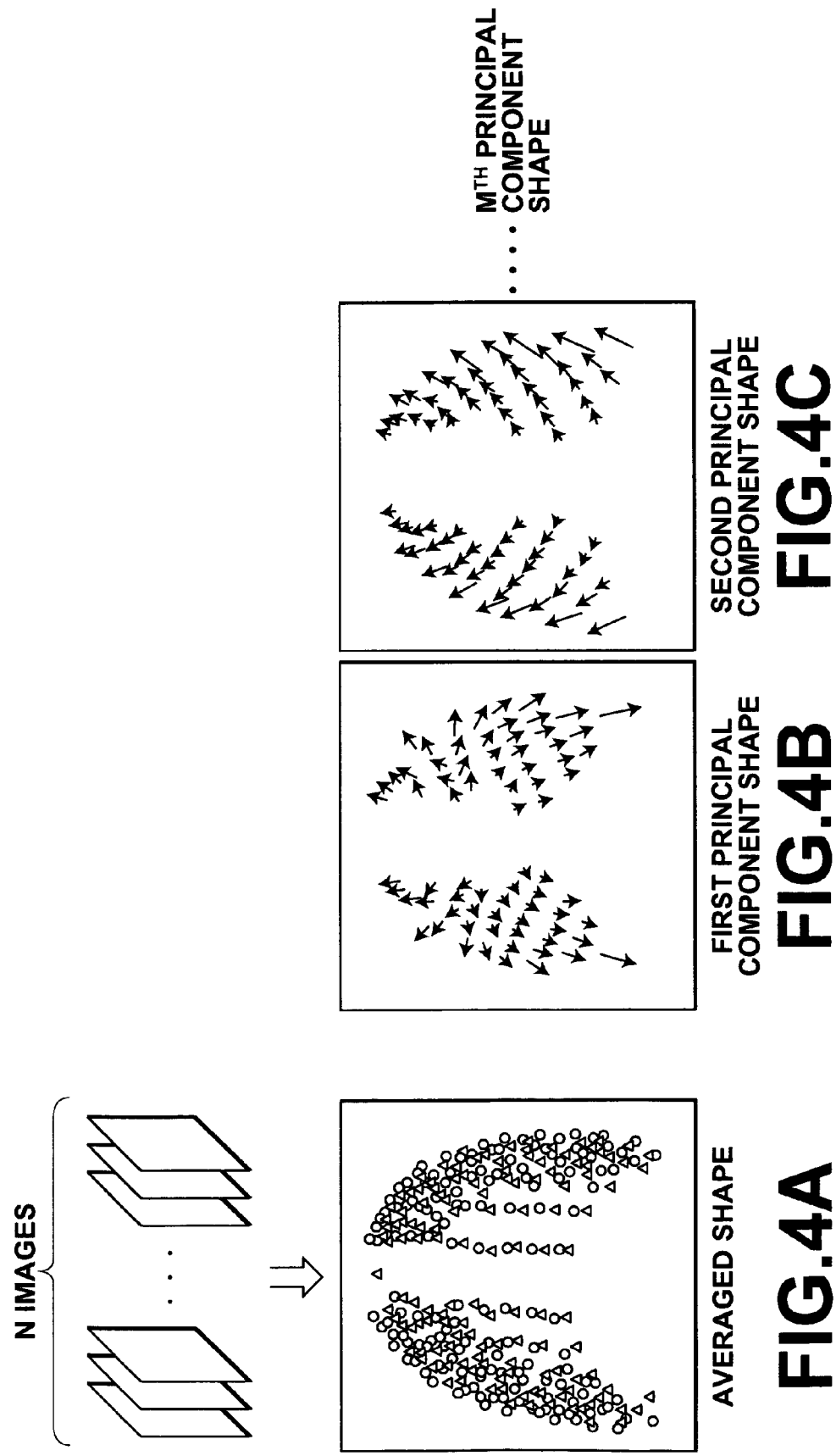
FIGS. 4A to 4C show a method of recognizing ribs by principal component analysis.

A shape $X=(x1, y1, \ldots, xi, yi, \ldots, xn, yn)$ of the ribs from which the n landmarks have been specified is found for each of the N sample images, and an averaged shape $X_{ave}=(X_{ave}1, Y_{ave}1, \ldots, X_{ave}i, Y_{ave}i, \ldots, x_{ave}n, y_{ave}n)$ is also found from an average of the rib shapes in the N images (see FIG. 4A where circles represent anterior ribs while triangles represent posterior ribs). Difference vectors $\Delta Xj=Xj-X_{ave}$ ($j=1,2, \ldots, N$) are found between the rib shapes X of the N sample images and the averaged shape $X_{ave}$, and principal component analysis is carried out on the N difference vectors $\Delta Xj$. Eigenvectors Ps (s=1, . . . , m) for the first to $m^{th}$ principal components (hereinafter referred to as principal component shapes) are then found.

The first principal component shape P1 obtained by the principal component analysis includes components to extend the ribs toward arrows shown in FIG. 4B while the second principal component shape P2 includes components to extend the ribs toward arrows shown in FIG. 4C. A model of any shape of the ribs can be approximated according to the following Equation (1) as a linear sum of the averaged shape $X_{ave}$ and the principal component shapes Ps (s=1, . . . , m):

$$X = Xave + \sum_{s}^{m} bsPs \qquad (1)$$

where bs are shape coefficients. By changing the shape coefficients bs, various rib shapes can be generated through warping of the averaged shape.

Therefore, in order to artificially generate the rib shape agreeing with the chest image P that has been input, the shape coefficients bs are found. Some points on the ribs radiographed in the chest image P are specified, and coordinate values of the points are substituted into Equation (1) for solving the shape coefficients bs. The shape coefficients bs are found as solutions of simultaneous equations by using the points of the same number as the coefficients bs. Even in the case where the chest image P does not have clearly radiographed ribs, the entire rib shapes can be generated by substituting the shape coefficients bs into Equation (1). More specifically, the shape coefficients bs can be found by extracting points on posterior ribs, since the posterior ribs can be easily extracted in the chest image by edge detection (see U.S. Patent Application Publication No. 20030210813, for example).

Alternatively, edges of the ribs may be detected in the chest image so that the rib shapes can be extracted by interpolation of points on the extracted ribs with a B-spline or the like.

Figure 5:
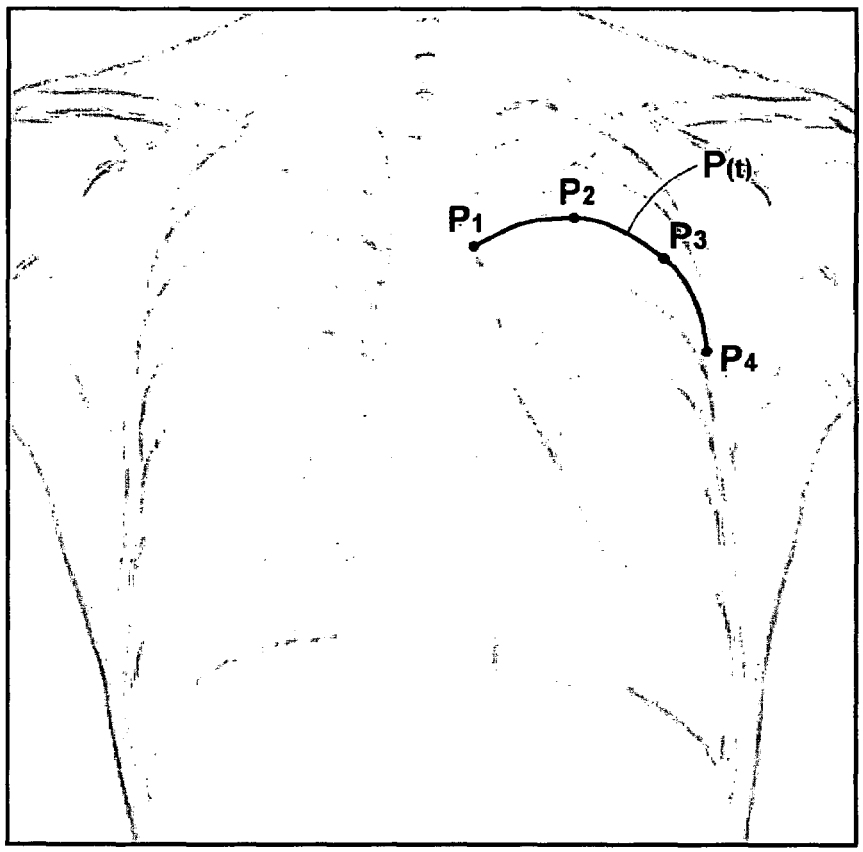
FIG. 5 shows a method of extracting a shape of a rib by using a B-spline curve.
Figure 6:
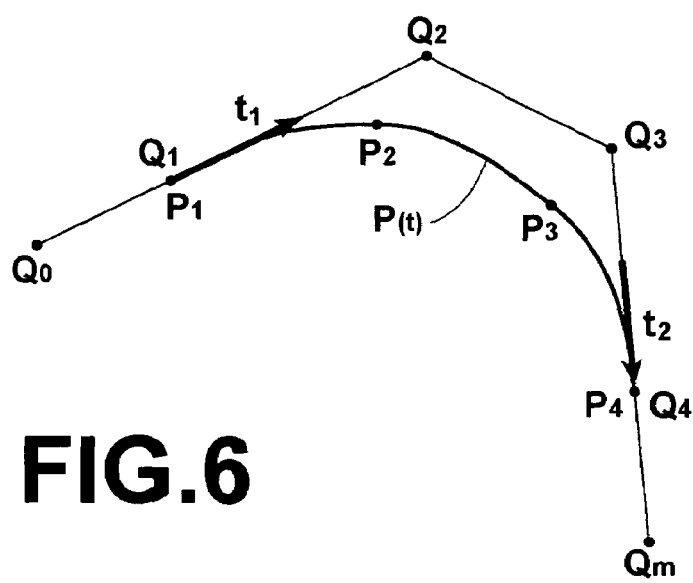
FIG. 6 shows control points of the B-spline curve.

More specifically, points P1, P2, P3 and so on are extracted on a curve of an edge of one of the ribs detected in the chest image, and a B-spline curve P(t) interpolating the points is found (see FIGS. 5 and 6). The $n^{th}$ degree B-spline curve P (t) can be expressed as follows, with control points Qi (i=1, 2, . . . ,n) and a parameter t:

$$P(t) = \sum_{i=0}^{n} B_{in}(t) Q_i$$

where $B_{in}(t)$ is a Bernstein polynomial.

In the case where n=3, the $3^{rd}$ degree B-spline curve P(t) can be expressed as follows:

$$P(t) = [B_0(t) \ B_1(t) \ B_2(t) \ B_3(t)] Q \text{ where} \qquad (2)$$

$$Q = [Q_0 \ Q_1 \ Q_2 \ Q_3]^T$$

$$B_0(t) = \frac{1}{6}(1-t)^3$$

$$B_1 = \frac{1}{2}t^3 + t^2 + \frac{2}{3}$$

$$B^2 = \frac{1}{2}t^3 + \frac{1}{2}t^2 + \frac{1}{2}t + \frac{1}{6}$$

$$B_3 = \frac{1}{6}t^3$$

Where $0 \leq t \leq 1$

Setting t=0 in Equation (2) leads to the following Equation (3):

$$Pi = \left(\frac{1}{6}Q_{i-1} + \frac{2}{3}Q_i + \frac{1}{6}Q_{i+1}\right) (i = 1, \ldots, m-1) \qquad (3)$$

where m refers to the number of the control points.

The control points are given as shown in FIG. 6, and the second control point $Q_2$ and the third control point $Q_3$ are located on tangents $t_1$ and $t_2$ of the starting point and the ending point of the curve representing the edge. Therefore, the control points $Q_i$ (i=1,2,3, . . . ) are found so as to satisfy the relationship between the points $Q_2$ and $Q_3$ and the relationship expressed by Equation (3) regarding the positions of the points Pi on the curve of the rib edge (see MEDICAL IMAGING TECHNOLOGY Vol. 20 No. 6 Nov. 2002 (in Japanese), Page 694-701 for details). The extracted points on the edge are interpolated with the B-spline curve so that the rib shape can be obtained.

(3) Detection of Lung Cancer Candidate Area (Step 4)

The abnormality detection means 30 carries out the enhancement processing to enhance the abnormality candidate area such as a nodule in the chest image P, and generates an enhanced image 110. An abnormality such as a cancerized nodule or tumor in the chest image P generally has a round shape, and is observed as an area of more concentrated gradient vectors and larger pixel values than a surrounding area. Such an abnormality is observed as a circular convex area of half-sphere shape having pixel values of the same density spreading in a concentric manner. In the circular convex area, the pixel values become larger from the periphery to the center thereof while density values become smaller. In other words, gradients of the pixel values are present. The gradients concentrate toward the center of the abnormality. Therefore, the abnormality can be detected by calculating the gradients of the pixel values as gradient vectors and by finding a degree of concentration of the gradient vectors.

More specifically, the degree of concentration of the gradient vectors is found in the following manner.

Firstly, a direction Φ of the gradient vectors is found for all the pixels in the target image according to Equation (4) below:

$$\phi = \tan^{-1} \frac{(f_{11} + f_{12} + f_{13} + f_{14} + f_{15}) - (f_{51} + f_{51} + f_{53} + f_{54} + f_{55})}{(f_{15} + f_{25} + f_{35} + f_{45} + f_{55}) - (f_{11} + f_{21} + f_{31} + f_{41} + f_{51})} \qquad (4)$$

Figure 7:
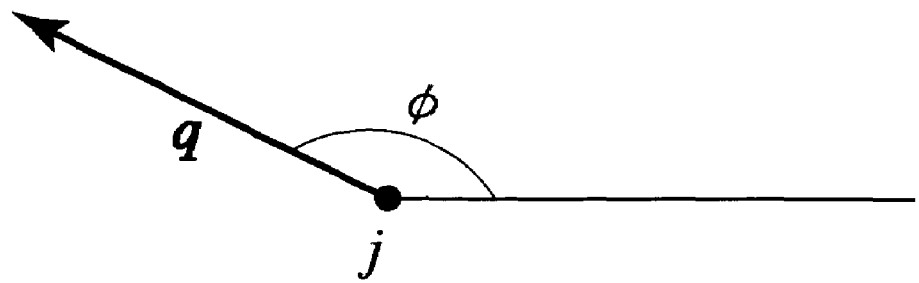
FIG. 7 explains a gradient.

In Equation (4) above, f11 to f55 Are pixel values on the periphery of a mask of 5×5 pixels surrounding a pixel j, as shown in FIG. 7.

For all the pixels P in the target image, a degree c of concentration is found according to Equation (5) below:

$$c_i = (1/N) \sum_{j=1}^{N} \cos \theta_j \qquad (5)$$

Figure 8:
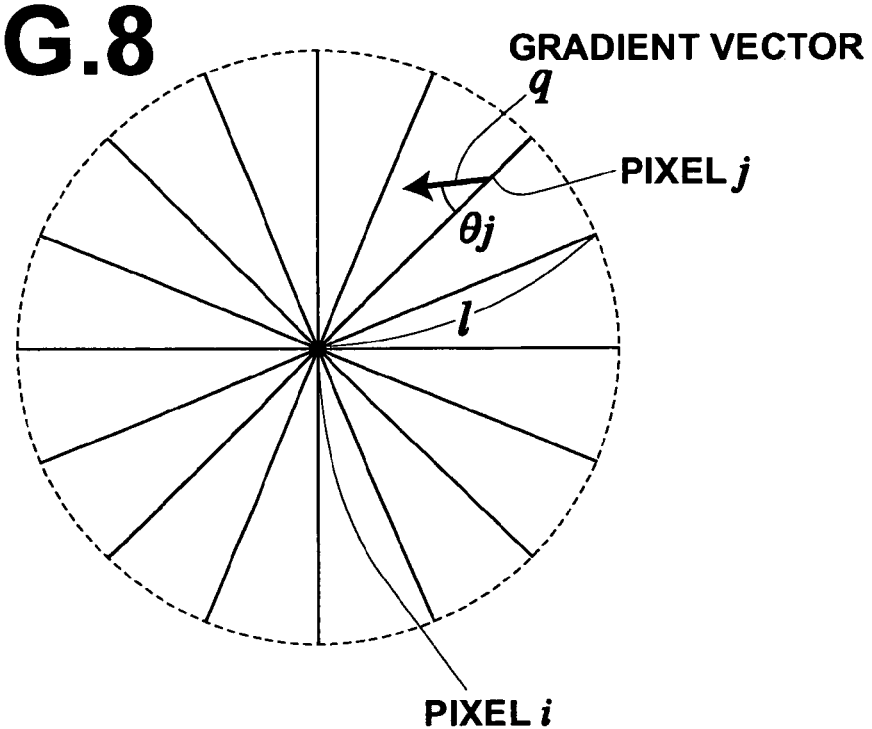
FIG. 8 explains a method of calculating a degree of concentration.

In Equation (5) above, N refers to the number of pixels in a circle of radium l whose center is a target pixel, θj is an angle formed by a line connecting a pixel i and the pixel j in the circle and the gradient vector found according to Equation (4) at the pixel j (see FIG. 8).

The degree c of concentration expressed by Equation (5) above becomes large at the pixel to which the gradient vectors concentrate. The gradient vector at the pixel j near a pattern of the nodule or tumor approximately point to the center thereof, regardless of the contrast of the pattern. Therefore, the pixel having the large degree c of concentration is the pixel at the center of the abnormality.

As means of evaluating such a degree of concentration, an adaptive ring filter may be used with a shape and a size devised for achieving detection of an abnormality regardless of a size and a shape of the abnormality.

In some cases, the degree of concentration becomes smaller at the center of abnormality as in the case of a nodule of lung cancer due to a turbulent vector field without monotonic change of pixel values, although the pixel values generally become larger from the center to the periphery of an abnormality. The adaptive ring filter can be applied to the case where the degree of concentration becomes smaller at the center due to non-monotonic change of pixel values causing the vector field to be turbulent, as well as to the case where the pixel values change monotonically.

Figure 9:
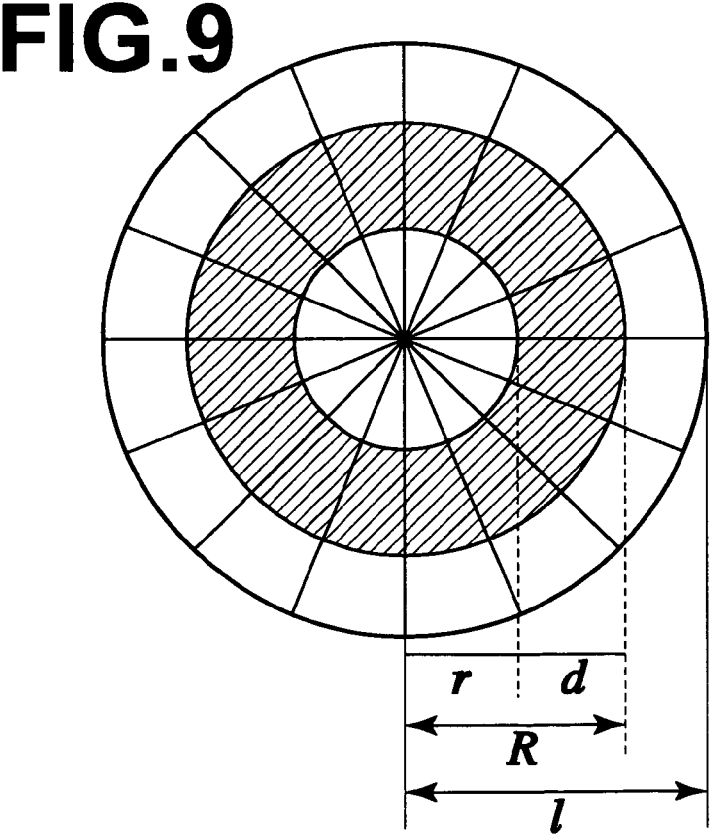
FIG. 9 explains calculation of an adaptive ring filter.

A mask area of the adaptive ring filter is a ring-shaped area shown in FIG. 9, and an inner radius thereof is determined in an adaptive manner. The radius of the inner circle is represented by r while the radius of the outer circle is R. The relationship between r and R can be expressed by Equation (6) below:

$$R = r + d \tag{6}$$

where d is a constant.

An output through the adaptive ring filter is expressed by Equation (7) below:

$$C(x, y) = \max_{0 \leq r \leq l-d} \frac{1}{N} \sum_{j=0}^{n-1} c_i \text{ where} \tag{7}$$

$$c_i = \frac{1}{d} \sum_{j=r+1}^{R} \cos\theta_j$$

Therefore, the output through the adaptive ring filter becomes a maximal value near the center of the circular convex area. For example, a circular convex area shown in FIG. 10A in the original image has the pixel values represented by FIG. 10B on the white line in FIG. 10A. By applying the adaptive ring filter thereto, pixel values that are larger than in the original image appear at the center thereof, as shown in FIG. 10C (see Wei Jun, Yoshihiro Ogiwara, and Hidehumi Obata, "Gradient Vector Concentration Filter for Extracting Cancer Candidate Area (in Japanese)" The Institute of Electronics, Information, and Communication Engineers Transactions D-II, Vol. J83-D-II, No. 1, pp. 118-125, January 2000).

By applying the adaptive ring filter to the chest image P, the enhanced image 110 with emphasis on a nodule or a tumor is generated. In the example shown by FIGS. 11A and 11B, an adaptive ring filter having l=20 mm and d=4 mm is applied. Hereinafter, detection of a nodule will be described. The nodule (shown by a white arrow) in FIG. 11A in the original image is enhanced by the adaptive ring filter, as shown in FIG. 11B.

However, since the ribs or the like overlap at the peripheral areas of the cardiothoracic part, the degree of concentration of density gradients is disturbed. Therefore, even in the case where the original image P is used for enhancement processing, the circular convex area is not enhanced well. For this reason, the enhancement processing is preferably carried out at the peripheral areas by removing an effect of a background image.

More specifically, a subtraction image 120 is generated by subtraction of the background image from the original image in the peripheral areas (3 and 8 in FIG. 3) detected by extraction of the cardiothoracic part. The enhancement processing is carried out on the subtraction image 120, for enhancement of the nodule by elimination of the effect of the background image. More specifically, components of the background image can be eliminated by subtraction of a smoothed image generated by smoothing the original image with a Gauss filter from the original image.

Figure 12A:
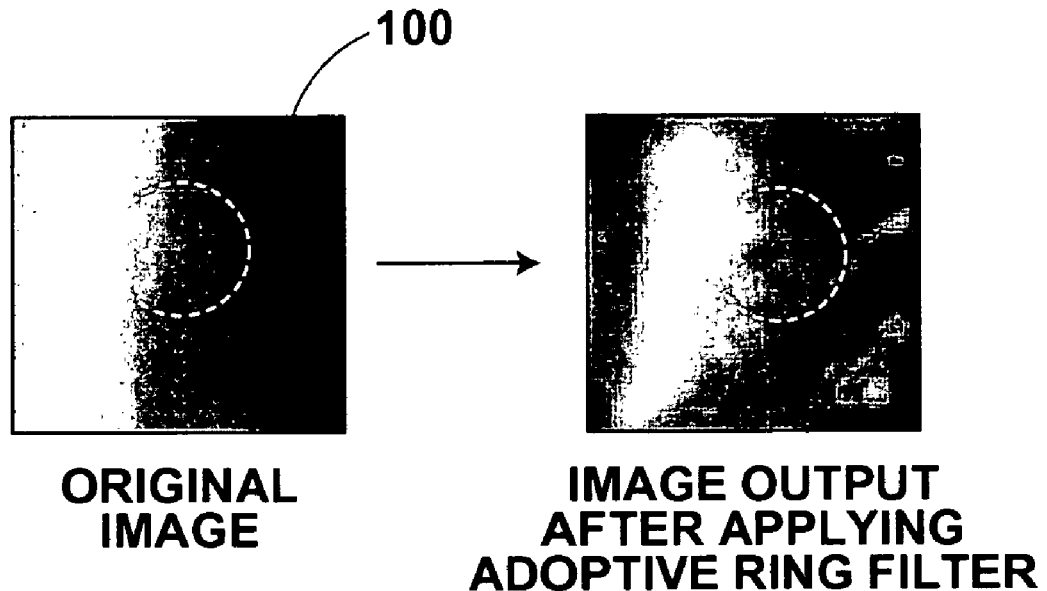
FIGS. 12A and 12B explain application of the adaptive ring filter to an original image and to a subtraction image.
Figure 12B:
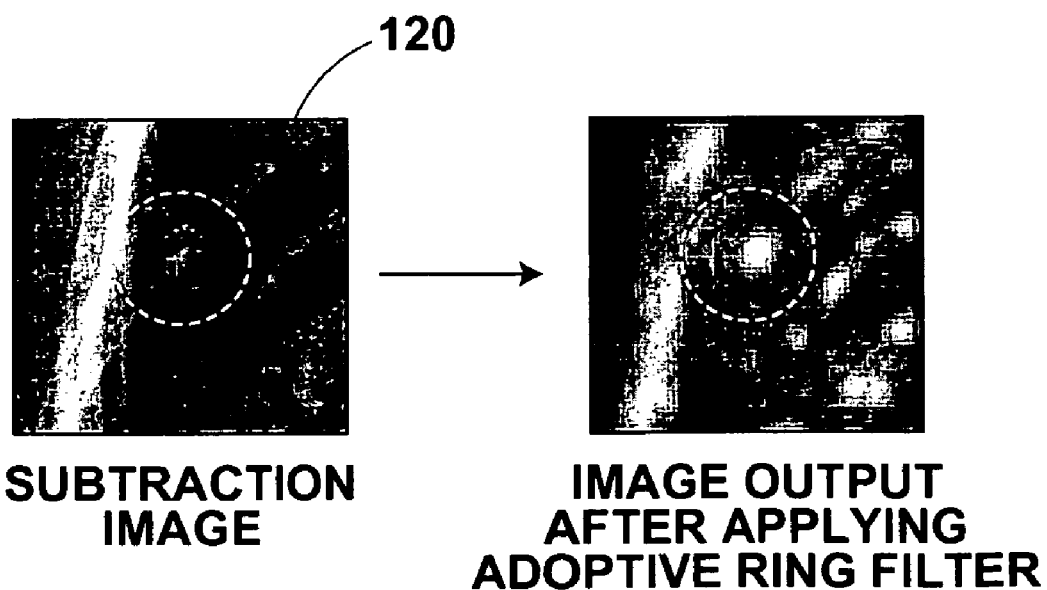

FIGS. 12A and 12B show an example of generating the enhanced image 110 by applying the adaptive ring filter. FIG. 12A shows generation of the enhanced image 110 from the original image. However, the nodule is not enhanced well due to the effect of the background image. FIG. 12B shows the case where the subtraction image 120, which has been generated by a difference between the original image 100 representing one of the peripheral areas and the smoothed image generated by applying a Gauss filter to the original image, is subjected to the enhancement processing to generate the enhanced image 110. The nodule in FIG. 12B is enhanced, without the effect of the background image.

Binary images 130 are then obtained by carrying out binarization processing on the enhanced image 110 with use of an increasing threshold value. In the binarization processing, the pixel values are replaced with a first pixel value (such as 255 representing white) in the case where the pixel values are equal to or larger than the predetermined threshold value while the pixel values are replaced with a second pixel value (such as 0 representing black) in the case where the pixel values are smaller than the threshold value, for generating the binary images 130. By carrying out the binarization processing, areas of the large pixel values such as the structures, a nodule or a tumor are replaced by areas of the first pixel value in the binary images 130 while the remaining areas are replaced by areas of the second pixel value. Therefore, the areas comprising series of the first pixel value are shown as isolated areas. In the case where the threshold value is small, the isolated areas in the corresponding binary image 130 are extracted to include cloud-like areas or the like of the background image. However, as the threshold value becomes larger, the isolated areas are extracted to include only the nodule, the tumor, or the structures, without the background image. Especially, in the case where the nodule or tumor is enhanced by the adaptive ring filter, the pixel values therein are higher than the other structures. Therefore, the nodule or tumor is expressed as an isolated area in the corresponding binary image 130 generated with use of the large threshold value. For this reason, the isolated areas appearing in the binary image 130 of the large threshold value are highly likely to represent abnormal patterns.

Figures 13A, 13B, 13C, 13D:
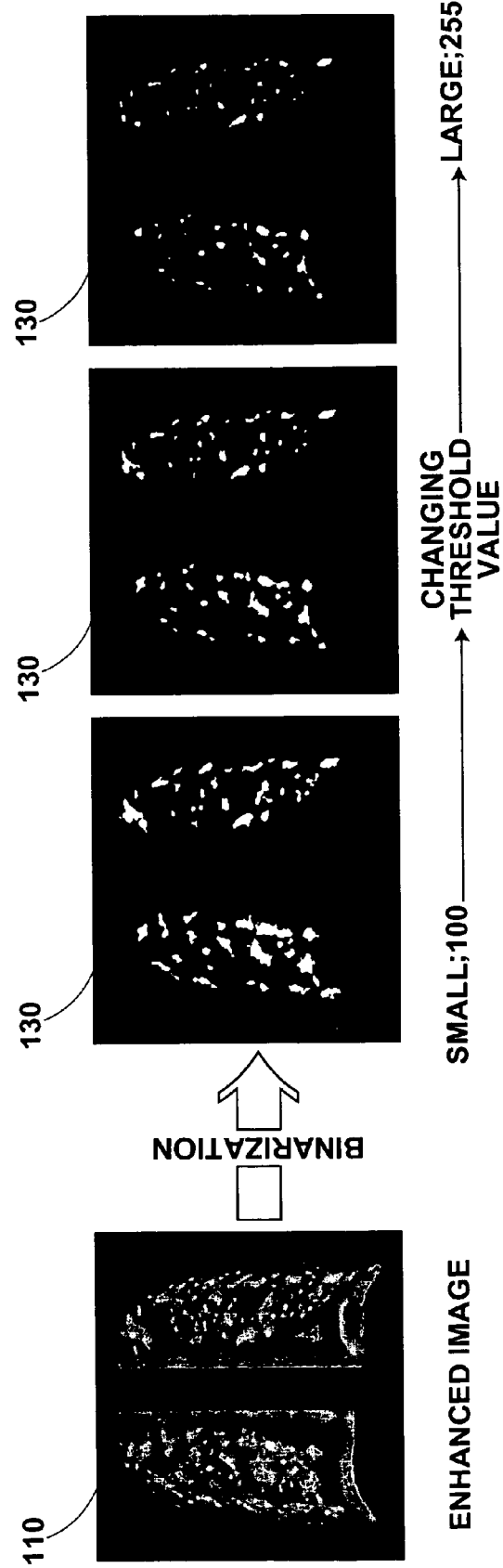
FIGS. 13A to 13D show an enhanced image and binary images generated by changing a threshold value.

FIGS. 13A to 13D show the case of binarization processing with the varying threshold value. FIG. 13A shows an example of the enhanced image 110 having been subjected to the enhancement processing on the original chest image P with use of the adaptive ring filter for enhancing the circular convex areas. The enhanced image 110 has been generated by 8-bit quantization, and thus has 0~255 gradations. In the case where the binarization processing is carried out by setting the threshold value to 100 on the enhanced image 110, the corresponding binary image 130 is obtained with the white isolated areas (areas having been replaced by the first pixel value) as shown in FIG. 13B. By incrementing the threshold value by 4 at each step, the binary images 130 at 39 steps are generated for extracting the isolated areas from each of the binary images 130. FIGS. 13C and 13D show the binary images 130 generated through the binarization processing in the case where the threshold value is set to 176 and 252, respectively.

Nodules have characteristics that isolated areas thereof have shapes approximating circles and occupy small areas. The isolated areas of the structures or the isolated areas including the background image tend to have lower degrees of circularity and occupy large areas. Therefore, the isolated areas having the degree of circularity that are equal to or lower than a predetermined value and having the size that is equal to or smaller than a predetermined value are extracted from the isolated areas appearing in each of the binary images 130, as nodule candidate areas.

A degree c of circularity can be found from an area S and a circumference L of each of the extracted isolated areas in the following manner.

A radius R of a circle whose area is S can be found as:

$$R = \sqrt{S/\pi}$$

A circumference L1 of the circle having the area S is found as:

$$L_1 = \sqrt{S\pi}$$

Therefore, the degree c of circularity can be found as follows, from a circumference L of each of the isolated areas and the circumference L1 of the circle having the area S:

$$c = \frac{L_1^2}{L^2} = \frac{4\pi S}{L^2}$$

Figure 19:
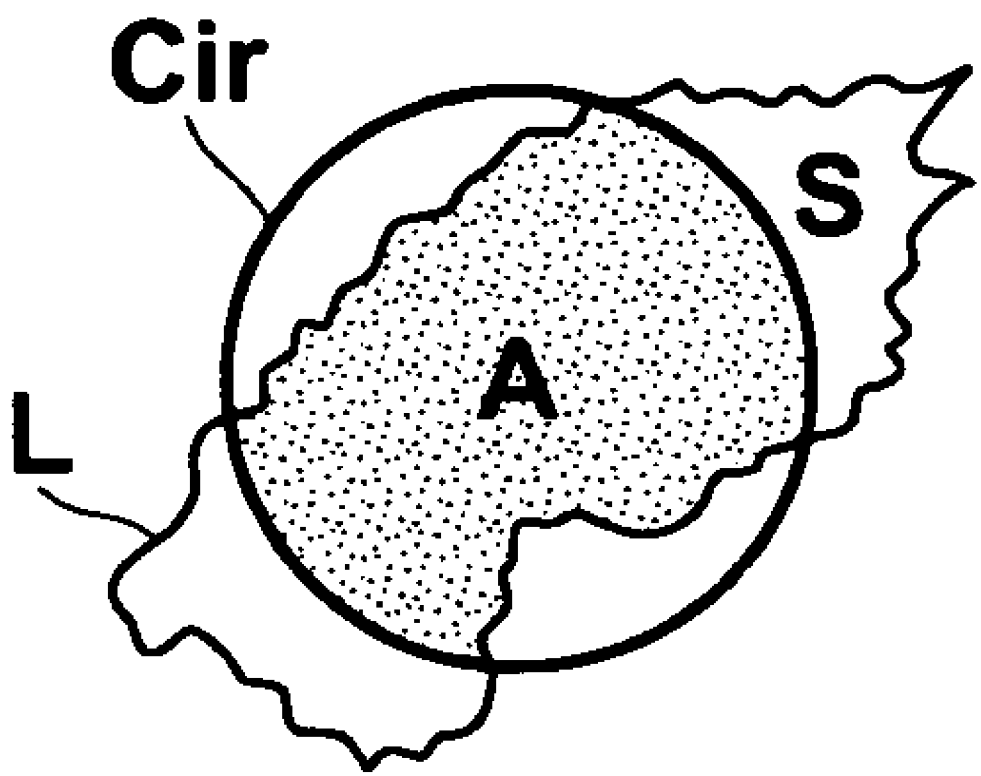
FIG. 19 is a diagram for explaining a manner in which circularity is derived.

Alternatively, the circularity may be derived in the manner described below, instead of by the above formula. As illustrated in FIG. 19, when an approximate circle Cir having a radius R is drawn with the center of gravity of an isolated area as its center, the circularity c may be derived according to the formula:

$$c = A/S$$

wherein S is the area of the isolated area, and A is the area of the portion of the isolated area that the approximate circle Cir overlaps.

More specifically, in the case where a nodule is diagnosed in the chest image, any one of the isolated areas is extracted as the nodule candidate area in each of the binary images 130 if the degree c of circularity according to the above formula is 0.7 or larger and if the radius thereof is smaller than 4.94 mm but larger than 2.26 mm.

The nodule enhanced by the adaptive ring filter has the pixel values larger than in the original image at the center thereof, as shown in FIG. 10C. Therefore, the nodule tends to appear as one of the isolated areas at the same position regardless of the varying threshold value. Consequently, in the case where the binary images 130 have been generated by changing the threshold value in the stepwise manner, any one of the isolated areas wherein the nodular candidate is extracted frequently at the same position is detected as the nodule candidate area.

Although detection of a nodule has been described above, a tumor can also be detected by changing the size of the adaptive ring filter or by changing a method of judgment based on the binary images.

(4) Classification (Step 5)

A method of classifying each of the areas of the lung fields based on the anatomic characteristics will be described next. The classification means 10 divides the lung fields into the apex areas (shown by 2 and 7 in FIG. 3), the peripheral areas (shown by 3 and 8), the mediastinal areas (shown by 4 and 9), and the lower diaphragm areas (shown by 5 and 10), with reference to the outline of the cardiothoracic part detected by lung field recognition at Step 2.

Figure 14:
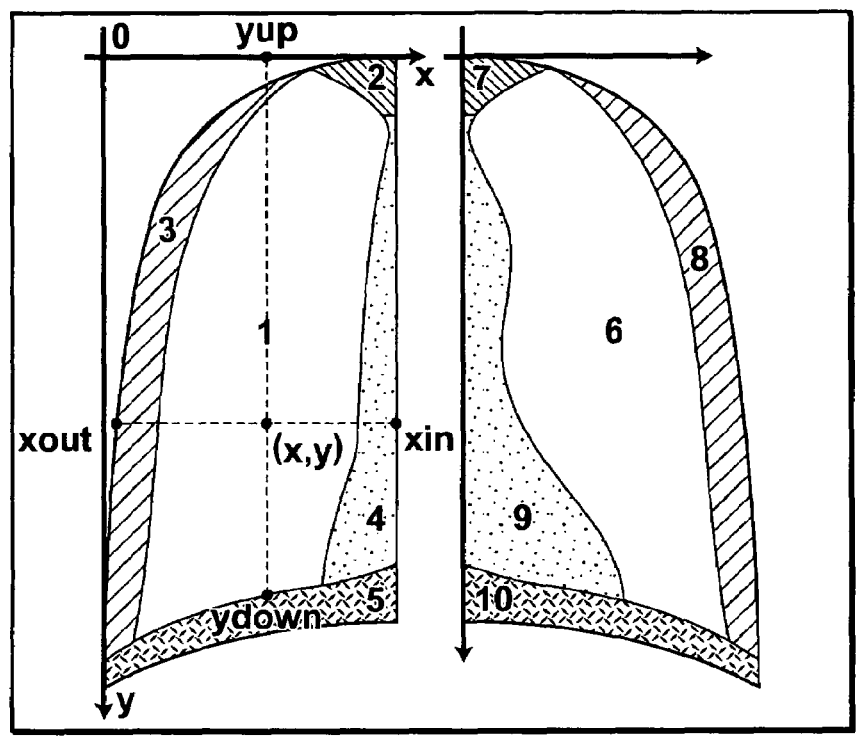
FIG. 14 shows a method of normalizing lung fields.

For this purpose, a coordinate value in an X direction is normalized so that the coordinate value of the outermost position of the cardiothoracic part becomes 0 while the coordinate value of the innermost position thereof becomes 1 in the left (or right) lung(1 or 6), as shown in FIG. 14. Likewise, a coordinate value in a Y direction is normalized so that the coordinate value of the uppermost position of the cardiothoracic part becomes 0 while the coordinate value of the lowermost position thereof becomes 1.

For example, let the coordinate values of the center of the lung cancer candidate area detected by the abnormality detection means 30 be (x, y) with reference to the origin at the upper left corner of the chest image P. In the case where the Y coordinate values of the uppermost point and the lowermost point at the intersections of the line in the Y direction passing through the center of the candidate area with the cardiothoracic part are respectively represented by yup and ydown, the Y coordinate value after the normalization can be expressed as:

$$newy = (y - yup)/(ydown - yup)$$

Likewise, in the case where the X coordinate values of the innermost point and the outermost point at the intersections of the line in the X direction passing through the center of the candidate area with the cardiothoracic part are respectively represented by xin and xout, the X coordinate value after the normalization can be expressed as:

$$newx = (xout - x)/(xout - xin)$$

In the mediastinal areas (the areas 4 and 9 in FIG. 14), x=1.0 is maintained.

Figure 15:
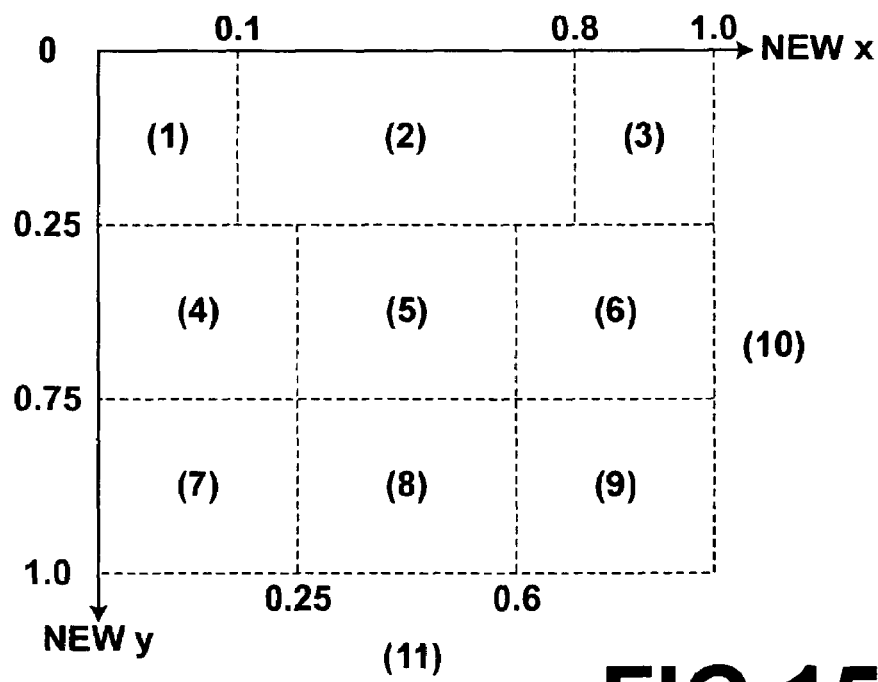
FIG. 15 shows classification according to normalized positions.

Based on the normalized coordinate values, the lung field is divided into 11 segments as shown in FIG. 15:

(1) 0≦newx<0.1, 0≦newy<0.25
(2) 0.1≦newx<0.8, 0≦newy<0.25
(3) 0.8=≦newx<1.0, 0≦newy<0.25
(4) 0≦newx<0.25, 0.25≦newy<0.75
(5) 0.25≦newx<0.6, 0.25≦newy<0.75
(6) 0.6≦newx<1.0, 0.25≦newy<0.75
(7) 0≦newx<0.25, 0.75=≦newy<1.0
(8) 0.25≦newx<0.6, 0.75≦newy<1.0
(9) 0.6≦newx<1.0, 0.75≦newy<1.0
(10) newx=1.0
(11) newy=1.0

Thereafter, whether each of the segments has a rib or whether each of the segments show an overlap of ribs are found based on the positions of the ribs found through the rib recognition, and a rib characteristic quantity representing the state of the ribs is found. Based on the rib characteristic quantity, each of the segments of (1) to (9) is divided into 3 segments. Each of the segments may partially have a rib without overlap and may have ribs with overlap. Therefore, the rib characteristic quantity can be represented as follows, by using an averaged rib overlap in each of the segments:

(a) rib characteristic quantity=0 if there is no rib;
(b) 0≦rib characteristic quantity≦1 if there is one rib;
(c) 1.0<rib characteristic quantity if there are two ribs. Therefore, the lung field is classified into 29 segments (=9×3+2).

(5) Generation of Artificial Image (Step 6)

How the artificial image generation means 20 generates the artificial image for each of the classified segments will be described below. Firstly, generation of the Eigen-images through principal component analysis will be described for the case where the Eigen-images have characteristics appearing specifically when the structures in each of the segments are normal. The Eigen-images are generated for each of the segments classified by the classification means 10. For example, the case will be described where the segment belongs to (4) and has the rib characteristic (b) representing one rib (hereinafter, this case is described as a category 4-1). As shown in FIG. 16A, M sample images are selected as teacher data by extracting rectangular segments of 80×80 pixels belonging to the category 4-1 from normal chest images with no abnormality radiographed therein. In FIG. 16A, areas of one rib are mainly extracted, but principal component analysis is carried out on the areas and the vicinity thereof.

Principal component analysis is carried out on pixel vectors Q=($q_{1,1}, \ldots, q_{1,80}, q_{2,1}, \ldots, q_{2,80}, \ldots q_{i,j}, \ldots, q_{80,1}, \ldots, q_{80,80}$) whose elements are the 6400 pixel values included in each of the M sample images of 80×80 pixels (see FIG. 17) in order to find eigenvectors (that is, the Eigen-images). FIG. 16B shows the case where the Eigen-images (80×80 pixels) Q1, Q2, ..., Q9 have been obtained by finding the $1^{st}$ to $9^{th}$ principal component vectors through principal component analysis of the sample images. The Eigen-images Q1 to Q9 show linear independence, and the artificial image can be generated as a linear sum of the Eigen-images Q1 to Q9.

For example, in the case where the lung cancer candidate area detected by the abnormality detection means 30 belongs to the category 4-1, an image R of the segment of 80×80 pixels including the candidate area is cut from the chest image P, and a correlation quantity a1, a2, ..., a9 are obtained between the image R and the Eigen-images Q1 to Q9. An artificial image R-model corresponding to the image R of the segment is generated as:

$$R\text{-model}=a1 \times Q1 + a2 \times Q2 + \ldots + a9 \times Q9$$

The case of generating the artificial image by principal component analysis of the sample images has been described above. However, as in the case of rib recognition, an averaged image may be found first from the sample images so that the artificial image can be generated by carrying out principal component analysis on the subtraction image generated from the averaged image and each of the sample images and by warping the averaged image.

Figure 18:
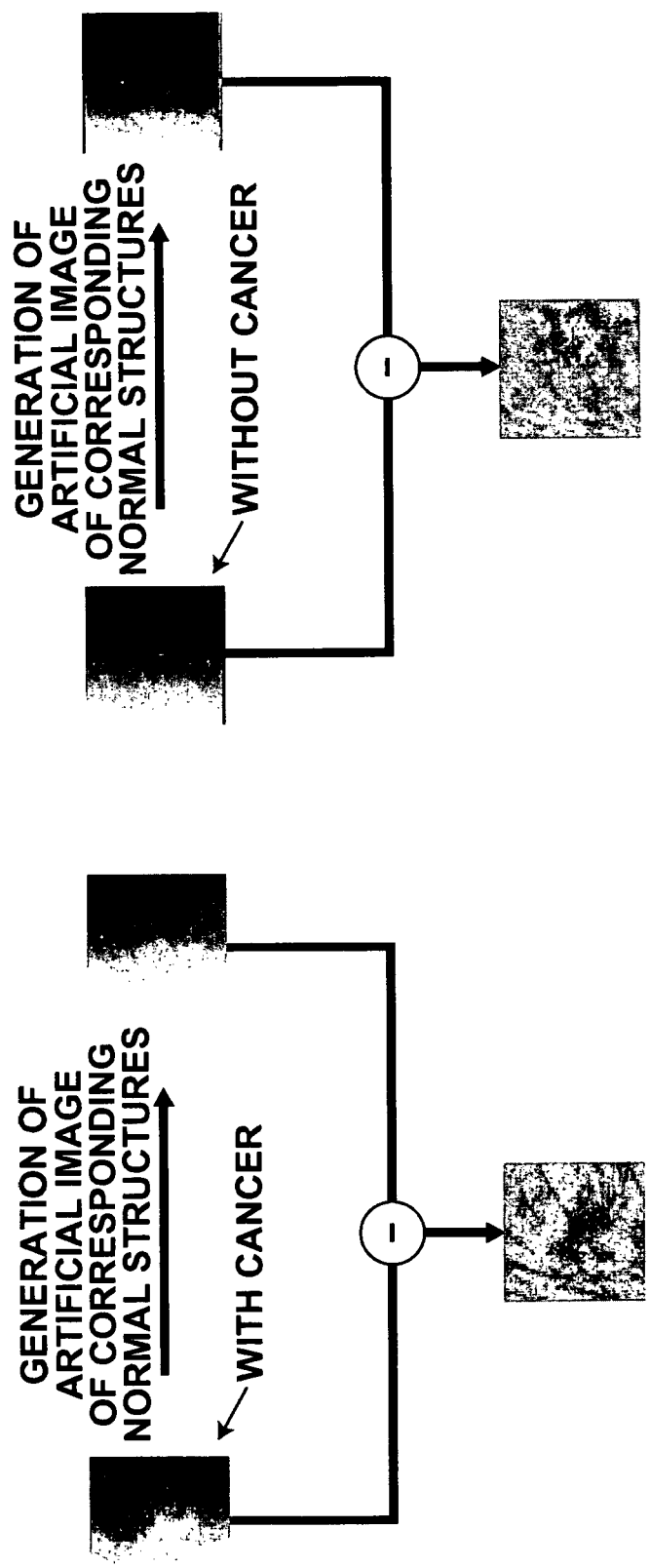
FIGS. 18A and 18B show examples of generated artificial images.

FIG. 18A shows an example of the artificial image of the normal structures corresponding to the image wherein cancer is present in the category 4-1. By subtraction of the artificial image from the original image having the cancer in the category 4-1, the cancer appears black.

Meanwhile, FIG. 18B shows an example of the artificial image corresponding to the image wherein cancer is absent in the category 4-1. Since no cancer is present in the category 4-1, subtraction of the artificial image from the original image generates an image of uniform density.

A least square distance or a normalized cross-correlation quantity or the like found between the artificial image R-model generated by the artificial image generation means 20 and the image R may be used as a characteristic quantity. By combining the characteristic quantity with another characteristic quantity, an abnormality may be judged by an identifier such as an SVM (Support Vector Machine), a Mahalanobis distance, or a neural network (see Japanese Unexamined Patent Publications No. 1997-167238 and 2002-74325 applied by the assignee, for example).

The case has been described where the artificial image is generated for the candidate area wherein an abnormality has been detected. However, a position around which the artificial image is generated may be specified in the chest image displayed on a display apparatus so that the artificial image can be generated regarding the position.

Although the case of chest image has been described above, an artificial image may be generated for a breast image by classifying the image into a pectoralis muscle area, a mammary gland area, and a fat area, for example (see Japanese Unexamined Patent Publication No. 2003-334183 applied by the assignee).

A program installed in a computer such as a personal computer via a CD-ROM or a network for executing the procedure described above in the computer may also be used as an image generation apparatus.

As has been described above, a medical image including the structures of anatomic characteristics is divided into the segments, and the segments are classified. The Eigen-images used as bases are generated for each of the segments, and the artificial image is then generated from the Eigen-images. Therefore, the image having the characteristics corresponding to each of the segments can be generated, which can improve accuracy of the artificial image. Furthermore, since the artificial image is generated for a part of the medical image, image generation is more efficient than in the case of generating the artificial image for the entire medical image.

What is claimed is:

1. An image generation apparatus comprising:
classification means for classifying a plurality of segments, obtained by dividing a medical image generated by radiography of a chest of a subject and including structures having anatomic characteristics into a plurality of types of segments in such a manner that segments that include structures having a similar anatomic characteristic are classified into the same type of segments; and
artificial image generation means for generating an artificial image of at least one of the plurality of segments, the artificial image including a normal structure and being generated based on the type of the at least one of the plurality of segments,
wherein the classification means includes:
lung field recognition means for recognizing lung fields in the chest image; and
rib recognition means for recognizing ribs in the chest image, and
wherein the classification means is configured to classify each of the plurality of segments into one of the plurality of types based on a position of each of the plurality of segments in a lung field, wherein said classification means further determines a number of ribs overlapping each of the plurality of segments, and the classification means further classifies the segments based on the number of ribs overlapping each segment.

2. The image generation apparatus according to claim 1 further comprising abnormality detection means for detecting a candidate area of an abnormality from the medical image, wherein
the artificial image generation means generates the artificial image corresponding to the segment including a position at which the candidate area has been detected.

3. The image generation apparatus according to claim 2, wherein
the artificial image generation means comprises Eigen-image storage means for storing Eigen-images respectively having characteristics appearing specifically to the classified segments when the structures in the segments are normal, and the artificial image generation means generates the artificial image of the segment by adding the corresponding Eigen-images after weighting the corresponding Eigen-images according to a degree of similarity with the segment regarding which the artificial image is generated.

4. The image generation apparatus according to claim 3, wherein the Eigen-images stored in the Eigen-image storage means are obtained by principal component analysis of an image of each of the segments having the structures that are normal in a medical image obtained by radiography of a subject.

5. The image generation apparatus according to claim 1, wherein the artificial image generation means comprises Eigen-image storage means for storing Eigen-images respectively having characteristics appearing specifically to the classified segments when the structures in the segments are normal, and the artificial image generation means generates the artificial image of the segment by adding the corresponding Eigen-images after weighting the corresponding Eigen-images according to a degree of similarity with the segment regarding which the artificial image is generated.

6. The image generation apparatus according to claim 1, wherein said artificial image generation means generates at least a first segment and a second segment based on at least one difference between the anatomic characteristics of the structures found in said first segment and the anatomic characteristics of the structures found in said second segment.

7. The image generation apparatus according to claim 1, wherein the classification provided by the classification means is different depending on the number of ribs overlapping each segment.

8. An image generation method comprising the steps of:

classifying a plurality of segments obtained by dividing a medical image generated by radiography of a chest of a subject and including structures having anatomic characteristics into a plurality of types of segments in such a manner that segments that include structures having a similar anatomic characteristic are classified into the same type of segments; and generating an artificial image of at least one of the plurality of segments, the artificial image including a normal structure and being generated based on the type of the at least one of the plurality of segments;

wherein said classifying comprises:
  recognizing lung fields in the chest image;
  recognizing ribs in the chest image; and
  classifying each of the plurality of segments into one of the plurality of types based on a position of each of the plurality of segments in a lung field, and also determining a number of ribs overlapping each of the plurality of segments, and classifying each of the plurality of segments based on the number of ribs overlapping each segment.

9. A computer-readable storage medium encoded with a computer program that causes a computer to function as:

classification means for classifying a plurality of segments obtained by dividing a medical image generated by radiography of a chest of a subject and including structures having anatomic characteristics into a plurality of types of segments in such a manner that segments that include structures having a similar anatomic characteristic are classified into the same type of segments; and artificial image generation means for generating an artificial image of at least one of the plurality of segments, the artificial image including a normal structure and being generated based on the type of the at least one of the plurality of segments;

wherein the classification means comprises:
  lung field recognition means for recognizing lung fields in the chest image; and
  rib recognition means for recognizing ribs in the chest image; and wherein the classification means is configured to classify each of the plurality of segments into one of the plurality of types based on a position in a lung field, wherein said classification means further determines a number of ribs overlapping each of the plurality of segments, and the classification means classifies the segments based on the number of ribs overlapping said segment.

* * * * *